(12) United States Patent
Porskrog et al.

(10) Patent No.: US 9,744,990 B2
(45) Date of Patent: Aug. 29, 2017

(54) HYDRAULIC STEERING SYSTEM

(71) Applicant: Danfoss Power Solutions ApS, Nordborg (DK)

(72) Inventors: Bendt Porskrog, Nordborg (DK); Casper Mikael Olesen, Sonderborg (DK); Abdul Karim Rahimzai, Sonderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 0 days.

(21) Appl. No.: 15/147,358

(22) Filed: May 5, 2016

(65) Prior Publication Data

US 2016/0332662 A1    Nov. 17, 2016

(30) Foreign Application Priority Data

May 13, 2015    (EP) ..................................... 15167579

(51) Int. Cl.
*B62D 5/06* (2006.01)
*B62D 5/07* (2006.01)
(Continued)

(52) U.S. Cl.
CPC ............. *B62D 5/062* (2013.01); *B62D 5/065* (2013.01); *B62D 5/075* (2013.01); *B62D 5/093* (2013.01); *B62D 5/12* (2013.01); *B62D 5/18* (2013.01)

(58) Field of Classification Search
CPC ........ B62D 5/062; B62D 5/065; B62D 5/075; B62D 5/093; B62D 5/12; B62D 5/18
See application file for complete search history.

(56) References Cited

U.S. PATENT DOCUMENTS 4,011,721 A    3/1977    Yip
7,631,590 B2 *  12/2009   Thomsen ............... B62D 5/065
                                                        60/384
(Continued)

FOREIGN PATENT DOCUMENTS

DE    101 64 392 A1    7/2003
EP    2 127 998 A1    12/2009
(Continued)

*Primary Examiner* — Anne Marie Boehler
*Assistant Examiner* — Marlon A Arce
(74) *Attorney, Agent, or Firm* — McCormick, Paulding & Huber LLP

(57) ABSTRACT

A hydraulic steering system 1 is described comprising a steering unit and a priority valve, said steering unit comprising a working port arrangement having two working ports, a supply port arrangement having a high pressure port and a low pressure port, a load sensing port, a main flow path having a main bleed and a metering device and being arranged between said high pressure port and said working port arrangement, an amplification flow path having an amplification bleed and being arranged between said high pressure port and said working port arrangement, said main bleed and said amplification bleed being controlled together by means of a steering handle and being closed in neutral position of said steering handle, wherein said priority valve comprises a priority outlet connected to said high pressure port of said steering unit, a valve element moveable in a priority direction to connect an inlet of said priority valve to said priority outlet, and a load sensing connection connected to said load sensing port of said steering unit, said priority outlet being connected to said load sensing connection via a priority valve bleed, a pressure at a point downstream said priority bleed acting on said valve element in said priority direction, wherein said load sensing port is connected to said low pressure port via a drain bleed being open in neutral (Continued)

position of said steering handle and closing upon actuation of said steering handle out of said neutral position.

20 Claims, 1 Drawing Sheet

(51) Int. Cl.
  *B62D 5/093* (2006.01)
  *B62D 5/065* (2006.01)
  *B62D 5/12* (2006.01)
  *B62D 5/18* (2006.01)

(56) References Cited

U.S. PATENT DOCUMENTS

| 9,242,668 B2* | 1/2016 | Ennemark | B62D 5/093 |
| 9,550,521 B2 | 1/2017 | Andersen et al. | |
| 2005/0205337 A1* | 9/2005 | Porskrog | B62D 5/093 |
| | | | 180/417 |
| 2014/0374187 A1 | 12/2014 | Arbjerg et al. | |
| 2016/0298658 A1 | 10/2016 | Liljenberg et al. | |
| 2016/0332663 A1* | 11/2016 | Porskrog | B62D 5/062 |

FOREIGN PATENT DOCUMENTS

| EP | 2 610 141 A1 | 7/2013 |
| WO | 2004/043768 A1 | 5/2004 |

* cited by examiner

HYDRAULIC STEERING SYSTEM

CROSS REFERENCE TO RELATED APPLICATION

Applicant hereby claims foreign priority benefits under U.S.C. §119 from European Patent Application No. EP15167579 filed on May 13, 2015, the content of which is incorporated by reference herein.

TECHNICAL FIELD

The present invention relates to a hydraulic steering system.

BACKGROUND

Such a steering system is used to steer a vehicle. In most cases a steering wheel which serves as a steering handle is connected to a steering unit of the steering system. When the steering wheel is actuated, the hydraulic steering unit supplies hydraulic fluid under pressure to a steering motor. The steering motor moves steered wheels of the vehicle so that the vehicle can change its moving direction.

SUMMARY

The object underlying the invention is to enable comfortable steering.

This object is solved with a hydraulic steering system comprising a steering unit and a priority valve, said steering unit comprising a working port arrangement having two working ports, a supply port arrangement having a high pressure port and a low pressure port, a load sensing port, a main flow path having a main bleed and a metering device and being arranged between said high pressure port and said working port arrangement, an amplification flow path having an amplification bleed and being arranged between said high pressure port and said working port arrangement, said main bleed and said amplification bleed being controlled together by means of a steering handle and being closed in neutral position of said steering handle, wherein said priority valve comprises a priority outlet connected to said high pressure port of said steering unit, a valve element moveable in a priority direction to connect an inlet of said priority valve to said priority outlet, and a load sensing connection connected to said load sensing port of said steering unit, said priority outlet being connected to said load sensing connection via a priority valve bleed, a pressure at a point downstream said priority bleed acting on said valve element in said priority direction, wherein said load sensing port is connected to said low pressure port via a drain bleed being open in neutral position of said steering handle and closing upon actuation of said steering handle out of said neutral position.

Such a steering system combines an integrated amplification function and a fast reaction of the priority valve to supply sufficient hydraulic fluid to the steering unit. Such a reaction is obtained before a pressure at the steering motor is build up so that the steering speed of the steering system is high and the steering forces which have to be produced by an operator or driver of the vehicle can be kept low. When the steering wheel is turned or another steering handle is actuated and leaves the neutral position, the pressure of hydraulic fluid through the drain bleed is increased and consequently the pressure acting on the valve element in priority direction is increased thereby moving the valve element of the priority to a position in which more or all of the hydraulic fluid entering the priority valve at its inlet is supplied to the high pressure port of the steering unit. This flow supplied from the priority valve is directed to the main flow path and to the auxiliary flow path. Only in the main flow path the hydraulic fluid is metered. The fluid flow through the amplification flow path is proportional or progressive to the flow through the main flow path thereby allowing an amplification of the total flow. This has the advantage that in undisturbed or normal steer mode the amplification is active and therefore only small actuations of the steering wheel or steering handle are necessary to have even large steering movements of the steering motor, whereas in a disturbed or emergency mode the metering device can be used as pump having a relatively low displacement.

Preferably said priority outlet is connected to said load sensing connection via a series connection of said priority valve bleed and a low sensing bleed, a pressure at a point between said priority valve bleed and said load sensing bleed acting on said valve element in said priority direction. The priority valve bleed and the load sensing bleed are both fixed bleeds. They form a pressure divider which makes it possible to more precisely adjust the pressure acting on the valve element of the priority valve in priority direction.

Preferably said priority outlet is connected to a point upstream a control bleed, wherein a pressure at a point downstream said control bleed acts on said valve element opposite said priority direction. The pressure downstream said control bleed generates a counter force acting against the pressure at the point downstream the priority valve bleed. This is an alternative to other solutions, like spring means, and secures that the actual pressures at the priority outlet can be taken into account.

Preferably said drain bleed is fully closed when said amplification bleed is fully open. When the amplification bleed is fully open the steering wheel (or any other steering handle) is in its extreme position. In this case a maximum flow should be directed to the motor and the priority valve should be controlled to deliver this maximum flow to the high pressure port of the steering unit.

In a preferred embodiment a torque compensator is provided establishing a pressure differential over said amplification path to be the same as a pressure differential over said main flow path. When the same pressure drop or pressure differential across the amplification flow path and across the main flow path is established, it can be secured that the amplification ratio between the main flow path and the amplification flow path will be constant even if a pressure drop occurs, for example at the metering device due to dirt particles or the like.

Preferably said torque compensator is formed by an adjustable flow resistance in said amplification flow path. When the flow resistance in the main flow path increases the adjustable flow resistance in the amplification flow path is adjusted accordingly. This is a simple way to achieve the same pressure differential or pressure drop in both flow paths.

Preferably said adjustable flow resistance is adjusted by a pressure in said main flow path. Such a pressure is in all cases available and can be used in a simple way to adjust the flow resistance in the amplification flow path.

Preferably said torque compensator comprises a check valve opening in a direction towards a point downstream said metering device. In this way the torque compensator is used for an additional function. It blocks the amplification flow path in case of an emergency steering. No further elements are necessary in the amplification flow path to fulfill this function.

Preferably an emergency check valve is arranged between said low pressure port and a point upstream said amplification bleed. This emergency check valve again is used in an emergency steering mode. It allows a fluid flow circulating through the main flow path and the steering motor. Further, it is possible that hydraulic fluid is sucked from the low pressure port if necessary.

In a preferred embodiment a steering motor is connected to said working port arrangement. This steering motor receives hydraulic fluid under pressure from the steering unit and is therefore able to move or pivot the steered wheels.

BRIEF DESCRIPTION OF THE DRAWINGS

A preferred embodiment of the invention is now described in more detail with reference to the drawing, wherein.

DETAILED DESCRIPTION

Figure 1:
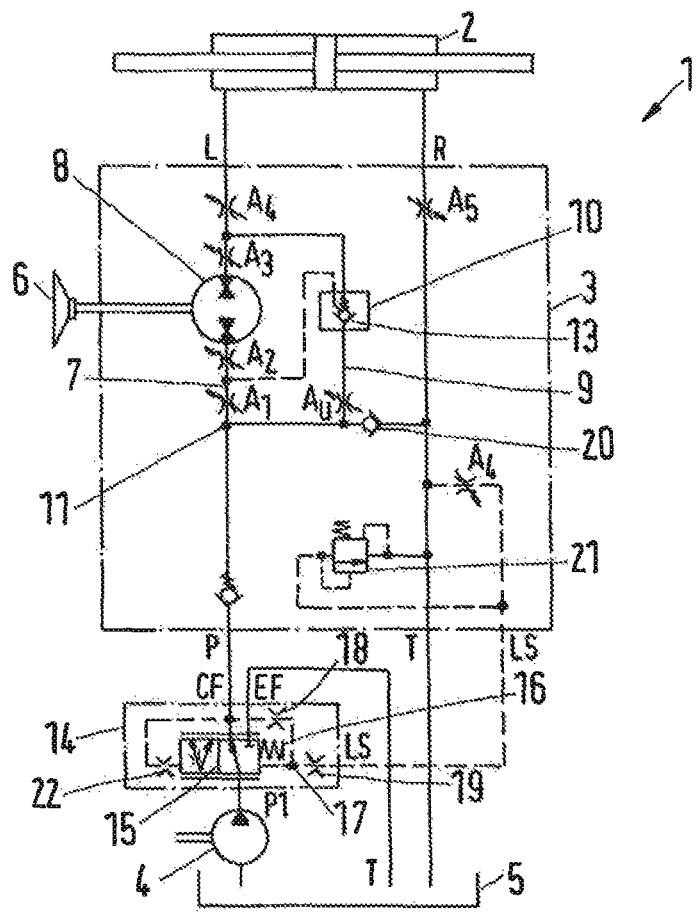
FIG. 1 is a schematic illustration of a steering system and
FIG. 2 shows the opening behavior of the bleeds of a steering unit of the steering system.

FIG. 1 shows schematically a hydraulic steering system 1 which comprises a steering motor 2, a steering unit 3, a pump 4 or any other pressure source, and a tank 5.

A steering wheel 6 is connected to the steering unit 3. However, any other kind of steering handle can be used instead of the steering wheel 6.

The steering unit 3 comprises a working port arrangement having two working ports L, R connected to said steering motor 2, a supply port arrangement having a high pressure port P and a low pressure port T. Furthermore, the steering unit 3 comprises a load sensing port LS.

The steering unit 3 comprises a main flow path 7 in which a metering device 8 is located. The metering device 8 is connected in series with a main bleed A1 and other bleeds A2, A3. Furthermore, depending on a steering direction, the metering device 8 is connected with bleed A4 for the left working port L or for the right working port R. The other one of these two working ports R, L is connected to low pressure port T via bleed A5.

An amplification flow path 9 is connected parallel to a part of the main flow path 7. An amplification bleed Au is located in the amplification flow path 9. Furthermore, a torque compensator 10 is connected in series with the amplification bleed Au.

The amplification flow path 9 is connected to a point 11 upstream the main bleed A1. Furthermore, the amplification flow path 9 is connected to a point 12 between bleed A3 and bleed A4. In other words, the amplification flow path 9 is basically arranged in parallel to the main flow path 7.

The torque compensator comprises a check valve 13 opening in the direction to point 12 between bleeds A3 and A4.

A priority valve 14 is located between the pump 4 and the high pressure port P. The priority valve comprises an inlet P1, a priority outlet CF and a further outlet EF. Furthermore, the priority valve 14 comprises a valve element 15 which is moved in a priority direction to connect the inlet P1 to priority outlet CF, or the valve element 15 is moved opposite to the priority direction to throttle a flow of fluid from the inlet P1 to the priority outlet CF and to direct a none prioritized part of the hydraulic fluid to the further outlet EF.

The valve element 15 is loaded in priority direction by means of a spring 16. Furthermore, the valve element 15 is loaded in priority direction with a pressure at a point 17 which is located between a priority valve bleed 18 and a load sensing bleed 19. The series connection of priority valve bleed 18 and load sensing bleed 19 connect the priority outlet CF to a load sensing connection LS1 of the priority valve 14. The load sensing connection LS1 is connected to the load sensing port LS of the steering unit.

The priority outlet CF of the priority valve is connected to a control bleed 22, more precisely to a point upstream this control bleed 22. A pressure at a point downstream of that control bleed 22 acts on the valve element 14 opposite said priority direction.

The valve element 15 therefore assumes a position in which there is an equilibrium between the force of the spring 16 and the pressure at point 17 on the one hand and the pressure downstream said control bleed 22 on the other hand.

The load sensing port LS of the steering unit 3 is connected to the low pressure port T of the steering unit 3 via a drain bleed Ad.

An emergency check valve 20 connects a low pressure port T with point 11 upstream the main bleed A1 and the amplification bleed Au.

Figure 2:
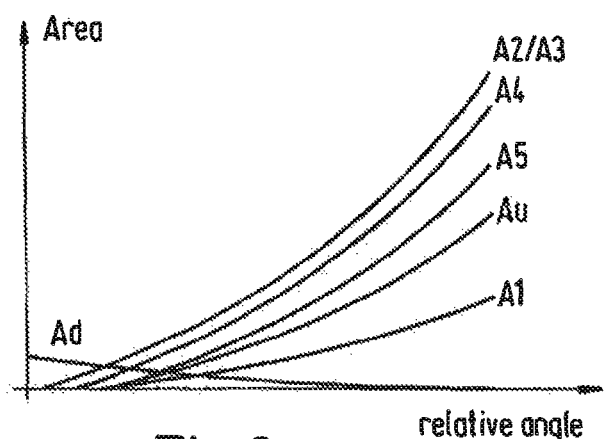

The bleeds A1-A5, Au and Ad are formed between a spool and a sleeve (not shown). One of spool and sleeve is connected to the steering wheel 6 and the other of spool and sleeve is connected to the metering device 8. When the spool and the sleeve are rotated relative to each other because of an actuation of the steering wheel 6, the bleeds A1-A5, Au open, i.e. they increase an area through which hydraulic fluid can flow whereas the drain bleed Ad closes, i.e. decreases the area through which hydraulic fluid can flow. The opening and closing characteristics of the bleeds A1-A5, Au and Ad are schematically shown in FIG. 2.

At a relative angle of 0° between spool and sleeve the bleeds A1-A5 and Au are closed. The drain bleed Ad is open and so there is close to no hydraulic pressure at the load sensing port LS and at the load sensing connection LS1. When the pump 4 runs, the hydraulic fluid flow will stream to the inlet P1 and across the priority valve 14 to port EF and on to tank 5. The priority valve 14 is a "dynamic type" meaning minor constant flow will stream out of load sensing connection LS1 of priority valve 14 into load sensing port LS of the steering unit 3 as soon as the pump is running.

When turning the steering wheel 6, the drain bleed Ad will close gradually over the entire control range: relative angles spool to sleeve from 0° to full deflection is normally 15°. The other bleeds A1-A5 and Au will open in parallel. Opening area will depend on pressure demand on the working port L, R to which hydraulic fluid is metered into. The higher pressure demand, the more drain bleed Ad will be closed and so the deflection spool to sleeve increases. When pressure demand increases, the constant flow into the load sensing port LS will be squeezed across the Ad bleed to match the pressure demand. When pressure increases at the load sensing port LS, the pressure increases as well at the load sensing connection LS1 of the priority vale 14. The priority valve 14 will lead the requested pump flow and pressure out of priority outlet CF into high pressure port P of the steering unit 3.

All hydraulic fluid supplied to the high pressure port P will be split between the parallel connected variable bleeds A1 and Au. The flow of hydraulic fluid across main bleed A1 is determined by the size of the metering device 8 and the speed of the steering wheel 6. The flow of hydraulic fluid across the amplification bleed Au is determined by the opening area of the amplification bleed Au. Pressure drop across the main bleed A1 and the amplification bleed Au will be the same and so the amplification will be constantly independent on steering speed under normal steering conditions: pump must as minimum be able to supply requested flow and pressure for the steering movement.

When the steering motor 2 has moved to end stroke or when pressure demand is higher than setting of a relief valve 21 located between the low pressure port T and the low sensing port LS and the steering wheel 6 is still turned, the spool/sleeve set will be forced into maximum deflection, thus the drain bleed Ad will be closed and the relief valve 21 will open to bleed dynamic flow from load sensing connection LS1 of the priority valve 14 into tank 5. So the valve element 15 of the priority valve 14 will be re-guided to lead the main flow from pump 4 to the other port EF of the priority valve 14 and onto tank 5 or another consumer.

The torque compensator 10 will secure the same pressure drop across the amplification path (amplification bleed Au and torque compensator 10) and main flow path 7 (main bleed A1, bleeds A2, A3, metering device 8). In case pressure drop may occur across the metering device 8, e.g. due to dirt particles entering the steering unit, the torque compensator 10 will generate the same pressure drop for the amplified hydraulic fluid. In this way the amplification ratio will remain constant.

As mentioned above, the torque compensator 10 comprises a check valve 13 opening in a direction from point 11 to point 12. The check valve 13 is loaded in closing direction by a pressure between main bleed A1 and bleed A2, in other words by a pressure downstream the main bleed A1.

When the pressure at the high pressure port P does not match the steering pressure requested, the metering device 8 will act as a pump, when torque is applied to the steering wheel 6. The displacement for emergency steering is purely determined by the size of the metering device 8. The check valve function of the torque compensator 10 will prevent back stream of hydraulic fluid across the amplification bleed Au.

When pump flow becomes insufficient, the emergency steering check valve 20 will open and hydraulic fluid will be led to the metering device 8 from return side of steering motor 2. Additional flow of hydraulic fluid can be sucked from the low pressure port T as needed.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering system comprising a steering unit and a priority valve,
    said steering unit comprising
    a working port arrangement (L, R) having two working ports,
    a supply port arrangement (P, T) having a high pressure port (P) and a low pressure port (T),
    a load sensing port (LS),
    a main flow path having a main bleed (A1) and a metering device and being arranged between said high pressure port (P) and said working port arrangement (L, R),
    an amplification flow path having an amplification bleed (Au) and being arranged between said high pressure port (P) and said working port arrangement (L, R),
    said main bleed (A1) and said amplification bleed (Au) being controlled together by means of a steering handle and being closed in neutral position of said steering handle,
    wherein said priority valve comprises
    a priority outlet (CF) connected to said high pressure port (P) of said steering unit,
    a valve element moveable in a priority direction to connect an inlet (P1) of said priority valve to said priority outlet (CF),
    and a load sensing connection (LS1) connected to said load sensing port (LS) of said steering unit,
    said priority outlet (CF) being connected to said load sensing connection (LS1) via a priority valve bleed,
    a pressure at a point downstream said priority bleed acting on said valve element in said priority direction,
    wherein said load sensing port (LS) is connected to said low pressure port (T) via a drain bleed being (Ad) open in neutral position of said steering handle and closing upon actuation of said steering handle out of said neutral position.

2. The hydraulic steering system according to claim 1, wherein said priority outlet (CF) is connected to said load sensing connection (LS1) via a series connection of said priority valve bleed and a load sensing bleed, a pressure at a point between said priority valve bleed and said load sensing bleed acting on said valve element in said priority direction.

3. The hydraulic steering system according to claim 1, wherein said priority outlet (CF) is connected to a point upstream a control bleed, wherein a pressure at a point downstream said control bleed acts on said valve element opposite said priority direction.

4. The hydraulic steering system according to claim 1, wherein said drain bleed (Ad) is fully closed, when said amplification bleed (Au) is fully open.

5. The hydraulic steering system according to claim 1, wherein a torque compensator is provided establishing a pressure differential over said amplification path to be the same as a pressure differential over said main flow path (A1, A2, A3).

6. The hydraulic steering system according to claim 5, wherein said torque compensator is formed by an adjustable flow resistance in said amplification flow path.

7. The hydraulic steering system according to claim 6, wherein said adjustable flow resistance is adjusted by a pressure in said main flow path.

8. The hydraulic steering system according to claim 5, wherein said torque compensator comprises a check valve opening in a direction towards a point downstream said metering device.

9. The hydraulic steering system according to claim 1, wherein an emergency check valve is arranged between said low pressure port (T) and a point upstream said amplification bleed (Au).

10. The hydraulic steering system according to claim 1 wherein a steering motor is connected to said working port arrangement (L, R).

11. The hydraulic steering system according to claim 2, wherein said priority outlet (CF) is connected to a point upstream a control bleed, wherein a pressure at a point downstream said control bleed acts on said valve element opposite said priority direction.

12. The hydraulic steering system according to claim 2, wherein said drain bleed (Ad) is fully closed, when said amplification bleed (Au) is fully open.

13. The hydraulic steering system according to claim 3, wherein said drain bleed (Ad) is fully closed, when said amplification bleed (Au) is fully open.

14. The hydraulic steering system according to claim 2, wherein a torque compensator is provided establishing a pressure differential over said amplification path to be the same as a pressure differential over said main flow path (A1, A2, A3).

15. The hydraulic steering system according to claim 3, wherein a torque compensator is provided establishing a pressure differential over said amplification path to be the same as a pressure differential over said main flow path (A1, A2, A3).

16. The hydraulic steering system according to claim 4, wherein a torque compensator is provided establishing a pressure differential over said amplification path to be the same as a pressure differential over said main flow path (A1, A2, A3).

17. The hydraulic steering system according to claim 6, wherein said torque compensator comprises a check valve opening in a direction towards a point downstream said metering device.

18. The hydraulic steering system according to claim 7, wherein said torque compensator comprises a check valve opening in a direction towards a point downstream said metering device.

19. The hydraulic steering system according to claim 2, wherein an emergency check valve is arranged between said low pressure port (T) and a point upstream said amplification bleed (Au).

20. The hydraulic steering system according to claim 3, wherein an emergency check valve is arranged between said low pressure port (T) and a point upstream said amplification bleed (Au).

* * * * *